(12) United States Patent
Linville et al.

(10) Patent No.: US 8,582,234 B2
(45) Date of Patent: Nov. 12, 2013

(54) SHAPED MAGNETIC WRITE POLE

(75) Inventors: Eric Linville, Shakopee, MN (US); Eric Roger Meloche, Burnsville, MN (US); Jianhua Xue, Maple Grove, MN (US); Huaqing Yin, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 13/093,484

(22) Filed: Apr. 25, 2011

(65) Prior Publication Data

US 2012/0268843 A1 Oct. 25, 2012

(51) Int. Cl.
*G11B 5/127* (2006.01)

(52) U.S. Cl.
USPC ............. 360/125.02; 360/125.1; 360/125.11; 360/125.14; 360/125.15

(58) Field of Classification Search
USPC ............... 360/125.03, 125.09, 125.1–125.15, 360/125.2, 119.02, 119.04, 125.02, 125.16, 360/125.21, 125.3
See application file for complete search history.

(56) References Cited

U.S. PATENT DOCUMENTS

| | | | |
|---|---|---|---|
| 6,504,675 B1 | 1/2003 | Shukh et al. | |
| 7,002,775 B2 * | 2/2006 | Hsu et al. | 360/125.03 |
| 7,119,988 B2 * | 10/2006 | Lille | 360/125.12 |
| 7,417,824 B2 * | 8/2008 | Kameda | 360/125.02 |
| 8,018,679 B2 * | 9/2011 | Hsiao et al. | 360/125.07 |
| 8,233,233 B1 * | 7/2012 | Shen et al. | 360/125.03 |
| 8,315,014 B2 * | 11/2012 | Lee et al. | 360/123.05 |
| 2004/0233578 A1 | 11/2004 | Gao | |
| 2006/0098340 A1 * | 5/2006 | Kameda | 360/126 |
| 2006/0288565 A1 | 12/2006 | Le et al. | |
| 2007/0188921 A1 * | 8/2007 | Mochizuki et al. | 360/126 |
| 2009/0059426 A1 * | 3/2009 | Sasaki et al. | 360/125.02 |
| 2009/0116144 A1 * | 5/2009 | Lee et al. | 360/125.01 |
| 2009/0154019 A1 * | 6/2009 | Hsiao et al. | 360/234.3 |
| 2012/0075749 A1 * | 3/2012 | Wu et al. | 360/123.12 |

* cited by examiner

*Primary Examiner* — Hoa T Nguyen
*Assistant Examiner* — Carlos E Garcia
(74) *Attorney, Agent, or Firm* — Hall Estill Attorneys at Law

(57) ABSTRACT

A magnetic shield is adjacent a write pole. The write pole has a body portion with a body thickness and an extension portion with parallel first and second sides that each tilt towards the magnetic shield at a predetermined angle proximal to an air bearing surface (ABS). The extension portion may be capable of enhancing a write field gradient of the magnetic shield by reducing magnetic saturation.

20 Claims, 4 Drawing Sheets

SHAPED MAGNETIC WRITE POLE

SUMMARY

Various embodiments of the present invention are generally directed to a magnetic shield that is capable of enhancing magnetic recording.

In accordance with various embodiments, a magnetic shield is adjacent a write pole. The write pole has a body portion with a body thickness and an extension portion with parallel first and second sides that each tilt towards the magnetic shield at a predetermined angle proximal to an air bearing surface (ABS). The extension portion may be capable of enhancing a write field gradient of the magnetic shield by reducing magnetic saturation.

DETAILED DESCRIPTION

Figure 1:
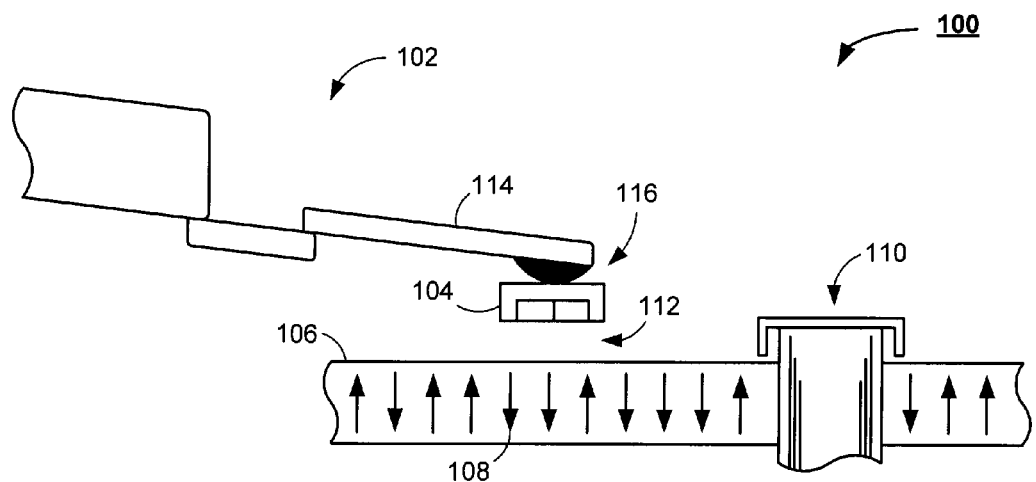
FIG. 1 is a block representation of an example portion of a data storage device.

Magnetic recording elements are generally discussed in the present disclosure, which generally relates to shaped magnetic write poles capable of enhancing write field gradient in data transducing heads. An increasing demand for higher data capacity in electronic devices has placed added emphasis on the size of data written to a data storage media. A higher data capacity often relies on fitting more data bits in a given area on a storage media, which can encounter limited write field and field gradient when recording ever smaller bits to a data storage medium. Thus, improving writeability in high data bit density recordings plays an increasingly important role in electronic devices with higher data capacity.

Accordingly, various embodiments of the present invention may shape the write pole of a magnetic recording element to reduce magnetic saturation of an adjacent magnetic shield. In one such embodiment, a write pole has a body portion with a body thickness and an extension portion with parallel first and second sides that each tilt towards the magnetic shield at a predetermined angle proximal to an air bearing surface (ABS). The tilted aspect of the extension portion can enhances write field gradient and data bit writeability through improved ability to program bits in a miniscule portion of a magnetic media.

While the ability to write bits in a small area of the media can lead to increased data capacity, an ability to control the magnetic saturation of shields near the write pole allows for improved write field gradient and higher linear data bit densities. An embodiment of a recording portion 100 of a data storage device is generally provided in FIG. 1. As shown, the recording portion 100 is present in a non-limiting environment in which various embodiments of the present invention can be practiced.

The recording portion 100 has an actuating assembly 102 that positions a transducing head 104 over a magnetic storage media 106 that is capable of storing programmed bits 108. The storage media 106 is attached to a spindle motor 110 that rotates during use to produce an air bearing surface (ABS) 112 on which a slider portion 114 of the actuating assembly 102 flies to position a head gimbal assembly (HGA) 116, which includes the transducing head 104, over a predetermined portion of the media 106.

The transducing head 104 can include one or more transducing elements, such as a magnetic writer and magnetically responsive reader, which operate to program and read data from the storage media 106, respectively. In this way, controlled motion of the actuating assembly 102 causes the transducers to align with tracks (not shown) defined on the storage media surfaces to write, read, and rewrite data.

Figure 2:
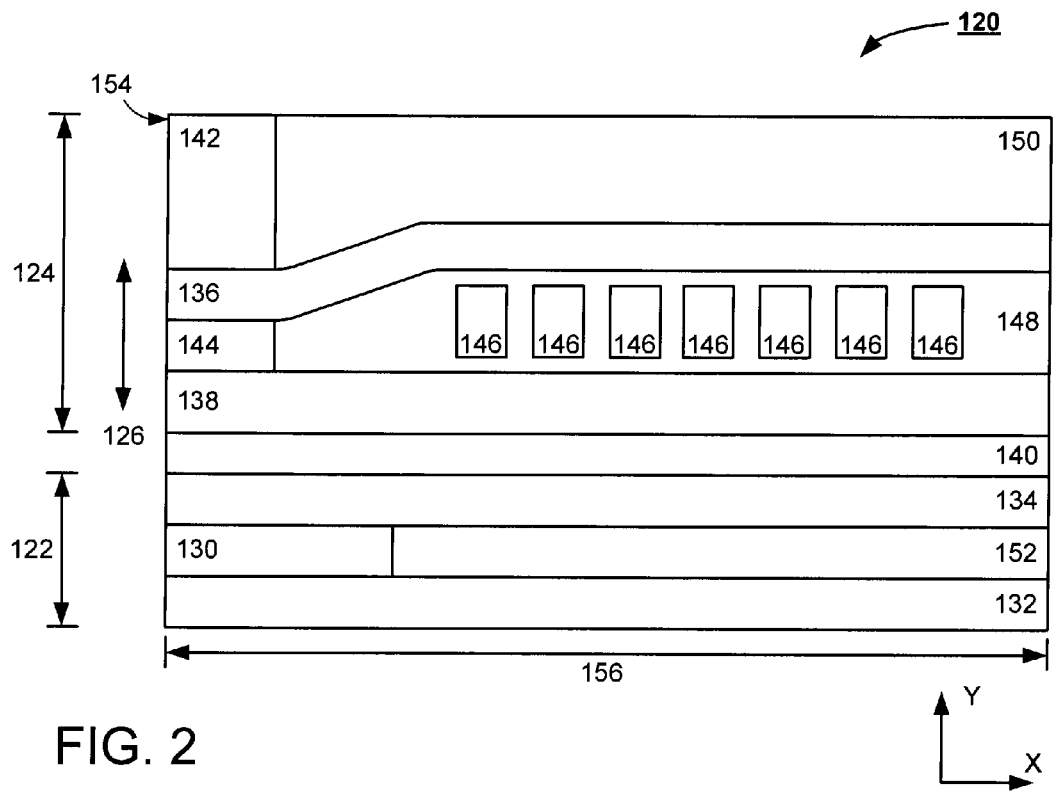
FIG. 2 generally illustrates an embodiment of a magnetic element capable of being used in the portion of the data storage device displayed in FIG. 1.

FIG. 2 displays a cross-sectional block representation of an example of a transducing head 120 that is capable of being used in the actuating assembly of FIG. 1. The head 120 can have one or more magnetic elements, such as the magnetic reader 122 and writer 124, which can operate individually, or concurrently, to write data to or retrieve data from an adjacent storage media, such as media 106 of FIG. 1. Each magnetic element 122 and 124 is constructed of a variety of shields and a transducing element that act to read data from and write data to a corresponding data medium along a data track 126.

As displayed, the magnetic reading element 122 has a magnetoresistive layer 130 disposed between leading and trailing shields 132 and 134. Meanwhile, the writing element 124 has a write (main) pole 136 and a return pole 138 that create a writing circuit to impart a predetermined magnetic orientation to the adjacent storage media. The return pole 138 is separated from the read element 122 by a gap layer 140 of non-magnetic material while the write pole 136 is disposed between a trailing shield 142 and an insulating material 144 that maintains separation of the writing poles 136 and 138.

The writing element 124 further includes a coil 146 that can be one or many individual wires capable of imparting a magnetic flux on the write pole 136 to travel through the write circuit that concludes at the return pole 138. Additional insulating layers 148, 150, and 152 surround the coil 146, write pole 138, and MR layer 130 to prevent leakage of magnetic flux within the transducing head 120.

The shields of the transducing head 120 can be characterized by their position with respect to the timing of encountering external bits, such as bits 106 of FIG. 1. In other words, the shields that encounter the external bits before the transducing elements 122 and 124 are "leading" shields while shields that see the bits after the transducing elements are "trailing" shields. Such characterization extends to the difference between "upstream" or "downstream" of the transducing elements in that, depending on the direction of travel for the head 120 and external bits, the shields can be either leading or trailing and either upstream or downstream.

The transducing head 120, and each of the respective layers, has a predetermined thickness measured along a Y axis, and a stripe height 156 measured along an X axis. With respect to the shields 132, 134, and 142, the respective shape and dimensions do not vary along the stripe height 156. As such, each shield maintains a predetermined thickness throughout the extent of each shield's stripe height.

Figure 3:
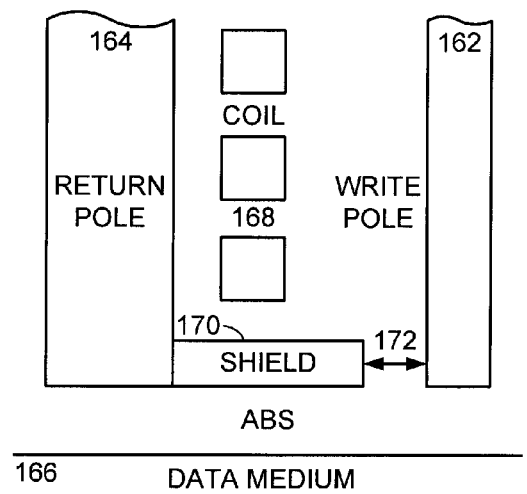
FIG. 3 shows an example of a recording portion of the magnetic element of FIG. 2.

An isolated view of an example of a recording portion 160 of a magnetic element is shown in FIG. 3. The recording portion 160 generally illustrates a write pole 162 and return pole 164 that operate to impart a magnetic flux onto a corresponding data medium 166. In operation, the write and return poles 162 and 164 function with a conductive coil 168 to transfer magnetic fields to form a closed circuit. A front shield 170, which is a magnetic shield located on the ABS, is positioned between the poles 162 and 164 on the ABS to reduce magnetic interference and focus data recording to a predetermined portion of the data medium 166.

Figure 4A:
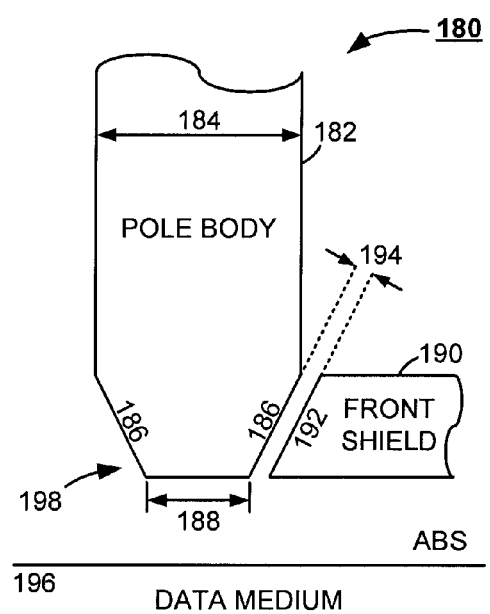
FIGS. 4A and 4B display an embodiment of the magnetic element of FIG. 2.
Figure 4B:
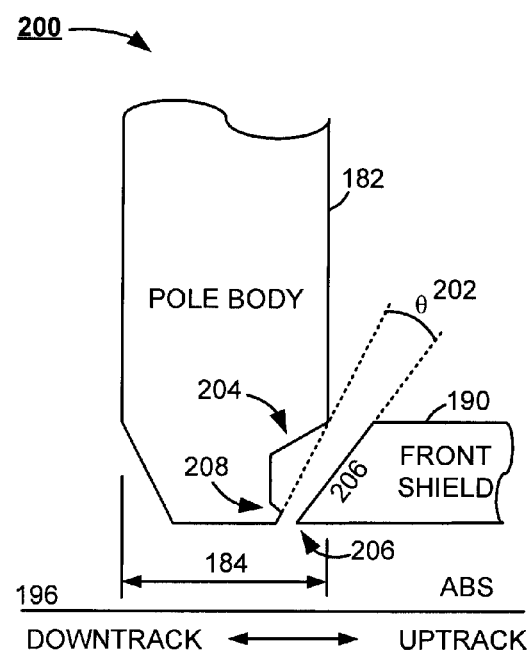

While the front shield 170 can be constructed in an unlimited variety of configurations, some embodiments position the shield 170 a predetermined gap length 172 from the write pole 162 to control the delivery of magnetic flux to the data medium 166. Various embodiments further configure the write pole 162, front shield 170, and gap length 172 to precisely tune and control flux delivery. FIGS. 4A and 4B illustrate various recording assemblies 180 and 200 each generally directed to tuning magnetic flux delivery.

The recording assembly 180 of FIG. 4A shows a write pole body 182 with a body thickness 184 that narrows via opposing tapered surfaces 186 to a pole tip length 188 at the ABS. A front shield 190 is positioned laterally adjacent to the pole body 182 and configured with a gap surface 192 that is parallel to one of the tapered surfaces 186 of the pole body 182. The parallel orientation of the tapered and gap surfaces 196 and 192 defines a predetermined gap distance 194 that separates the pole body 182 from the front shield 190.

The parallel geometric configuration of the gap surface 192 of the front shield 190 in relation to the tapered surface 186 of the pole body 182 allows magnetic flux to flow from the pole body 182 to the front shield 190 at the ABS, which aids in controlling what portion of the subject data medium 196 receives magnetic write fields from the pole body 182. However, the close proximity of the front shield 190 and the pole tip 198 can lead to magnetic saturation of the front shield 190 via magnetic write fields flowing to the front shield 190 at the ABS, which can result in decreased write flux reaching the data medium 196.

In addition, saturation of the front shield 190 can reduce the effective magnetic field write gradient and overall performance of the recording assembly 180, especially in high linear bit density recordings. FIG. 4B provides recording assembly 200 that is directed to reduce the magnetic saturation of the front shield 190 with at least one saturation features 202 and 204. A first saturation feature 202 angles the gap surface 196 of the front shield 190 into a non-parallel orientation with the tapered surface 186 of the pole body 182. The first saturation feature 202 can be characterized, in some embodiments, as an increased "take off angle" with respect to the ABS by differing from the angle of the tapered surface 186 with respect to the ABS.

While the installation of the first saturation feature 202 can produce enhanced magnetic write field and write field gradient, the design can be limited, in both construction and operation, by the sharp shield tip 206 at the ABS. That is, the enhanced field from the pole body 182 that results from increasing the gap 194 distance away from the ABS is countered by localized magnetic saturation at the sharp shield tip 206, which limits the write field and write field gradient improvements.

The addition, or substitution, of a second saturation feature 204 can vary the magnetic saturation of the front shield 190, particularly at the shield tip 206. The second saturation feature 204 can be characterized as a "hook" configuration due to the removal of part of the tapered surface 186 with the exclusion of the portion of the tapered surface 186 at the ABS. The hook design provides an increased distance from the gap surface 192 of the front shield 190 away from the ABS while having an optimal gap distance at the ABS, which can minimize superfluous flow of magnetic flux to the front shield 190 from the pole body 182.

However, construction of the recording assembly 200 with the second saturation feature 204 can result in limited results in some operating situations due to the hook tip 208 becoming magnetically saturated and not providing sufficient area for magnetic flux to flow to the front shield 190. The saturation of the hook tip 208 can compromise the skew performance of the second saturation feature 204 with limited magnetic field angle enhancement and magnetic wall angle establishment. Thus, the inclusion of one or more saturation features 202 and 204 can vary the magnetic saturation of the front shield 190, but can result in limited results in some operational situations.

Figure 5A:
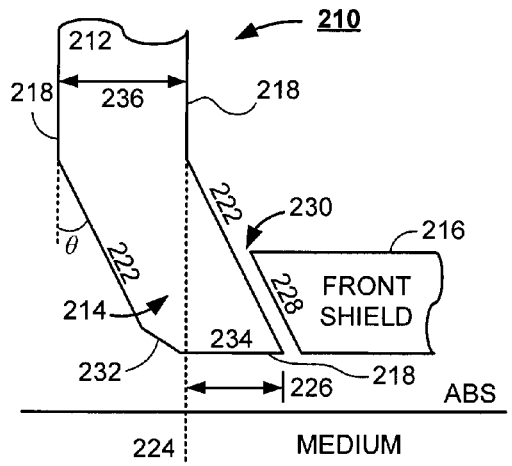
FIGS. 5A through 5D illustrate an example of a magnetic recording element configurations capable of being used in the magnetic element of FIG. 2.
Figure 5B:
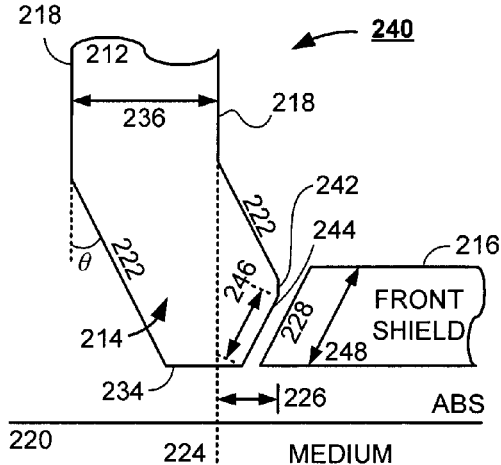

Accordingly, FIGS. 5A through 5B generally provide a variety of recording assemblies capable of tuning magnetic saturation of both the write pole and front shield. Recording assembly 210 is shown in FIG. 5A and provides a pole body 212 with an extension portion 214 that tilts towards the front shield 216 by a predetermined angle (θ) in relation to the pole body 212. The pole body 212 is defined by parallel body surfaces 218 that are orthogonal to the corresponding data medium 220 and ABS. The extension portion 214 continuously extends from the pole body 212 with parallel extension surfaces 222 that tilt towards the front shield 216 and extend past the downtrack plane 224 of the pole body 212. That is, the extension portion 214 laterally surpasses the extent of pole body 212 by a predetermined extension distance 226.

The front shield 216 is constructed with a gap surface 228 that is parallel to the extension surface 222 to define a uniform gap 230 that separates the shield 216 from the extension portion 214 and provides a reduced first shield width at the ABS and an extended second shield width distal to the ABS. In conjunction with the gap surface 228 configuration, the recording assembly 210 can tune the magnetic flux provided to the data medium 220 and reduce magnetic saturation by decreasing the thickness of the extension portion 214 at the ABS with a reduction surface 232 that is angled with respect to the extension surfaces 222, which results in a write tip surface 234 that is less than the thickness 236 of the pole body 212.

The presentation of a uniform gap 230, gap surface 228, and extension surface 222 proximal to the front shield 216 maintains a high magnetic field angle while reducing the interaction between the pole body 212 and front shield 216. Magnetic saturation of both the front shield 216 and extension portion 214 is minimized by avoiding an overly narrow write tip surface 234, such as the hook tip 208 of FIG. 4B, at the ABS. The design of the front shield 216 and extension portion 214 further allow for tuning of the magnetic saturation of the front shield 216 by varying the separation distance of the gap 230, which can provide enhanced magnetic write field gradient when write field intensity is high.

FIG. 5B displays recording assembly 240 that includes an extension portion 214 with parallel extension surfaces 222 that extend past the downtrack plane 224 corresponding to the lateral extent of the pole body 212. The extension surfaces are shaped with first and second bevel surfaces 242 and 244 that taper away from the front shield 216 to a write tip surface 234 with a reduced length compared to the pole body thickness 236. The second bevel surface 244 is designed to have a length 246 that is less than the gap surface length 248 so that interaction between the gap surface 228 of the front shield 216 and the extension portion 214 is minimized.

Figure 5C:
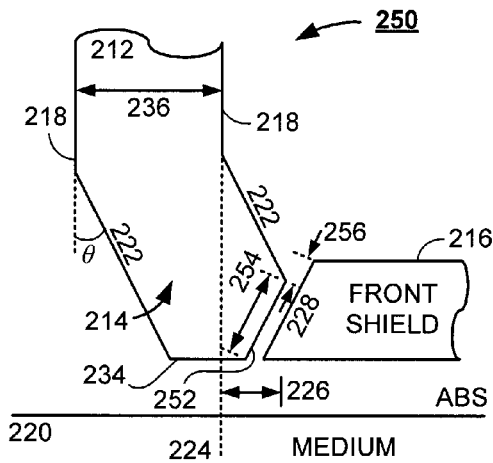

The bevel surfaces 242 and 244 provide sufficient surface area to allow magnetic flux to flow to the front shield, but not enough surface area to saturate the front shield to the point of performance degradation. As a result, the magnetic field angle is high at the ABS and magnetic field gradient is optimized. FIG. 5C provides another example of a recording assembly 250 that may allow for tuning of the magnetic performance of the write pole. In the extension portion 214 of FIG. 5C, the parallel extension surfaces 222 extend to a single bevel gap surface 252 that tapers to the write tip surface 234 parallel to the front shield gap surface 228, which provides an extended first shield width at the ABS and a reduced second shield width distal to the ABS.

The single bevel surface 252 has a length 254, in comparison to the gap surface length 248, which provides an offset distance 256 that reduces the surface area of the extension portion 214 that faces the front shield 216. As such, magnetic flux reaching the front shield 216 is decreased and the magnetic saturation of the gap surface 228 is minimized.

Much like the bevel surfaces 242 and 244 of FIG. 5B, the single bevel surface 252 of FIG. 5C has an increased write field and write field gradient due to reduced interaction surface area near the ABS. The single bevel surface 252 that is parallel to the gap surface 228 allows magnetic flux to reach the ABS and data medium 220 at a high angle that minimizes magnetic saturation in conjunction with optimized write field and write field gradient via the reduced length of the write tip surface 234 and thickness of the extension portion 214.

Figure 5D:
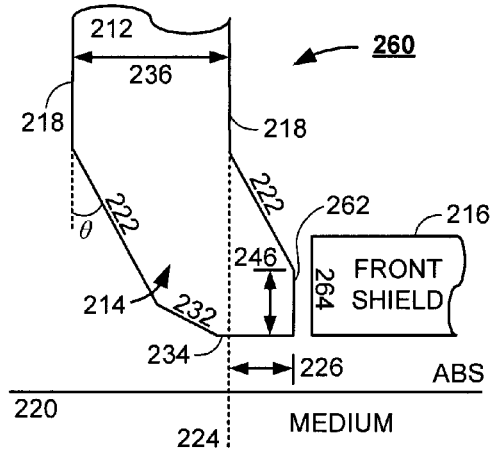

FIG. 5D illustrates another embodiment of a recording assembly 260 that can allow for tuning of the magnetic performance of the write pole with minimal front shield 216 modifications. The extension portion 214 extends via parallel extension surfaces 222 to a first vertical gap surface 262 that is orthogonal the data medium 220 and ABS and parallel to a shield vertical gap surface 264. Such a vertical configuration of the gap surfaces 262 and 264 can provide simplified manufacturing and increased performance uniformity.

Interaction between the front shield 216 and the extension portion 214 can be tuned by offsetting the lengths of the gap surfaces 262 and 264, by a predetermined offset distance similar to distance 254 of FIG. 5C. Magnetic saturation can further be tuned by including the reduction surface 232 that shortens the length of the write pole tip 234 at the ABS while reducing the thickness of the extension portion. As discussed above, such reduction in extension portion 214 size can enhance both write field angle and gradient.

The various recording assemblies of FIGS. 5A-5D, however, are not limited to the embodiments displayed and can be modified and combined, at will, to tune the performance characteristics of the write pole to accommodate a large range of operating parameters. As such, various shapes, features, and materials can be modified and added to further allow performance tuning. In a non-limiting embodiment that utilizes additional material, a negative Ku material that exhibits uni-axial anisotropy can be placed at or near the ABS of the extension portion 214 to prevent magnetic flux leakage and erasure from the bottom of the write pole.

Figure 6:
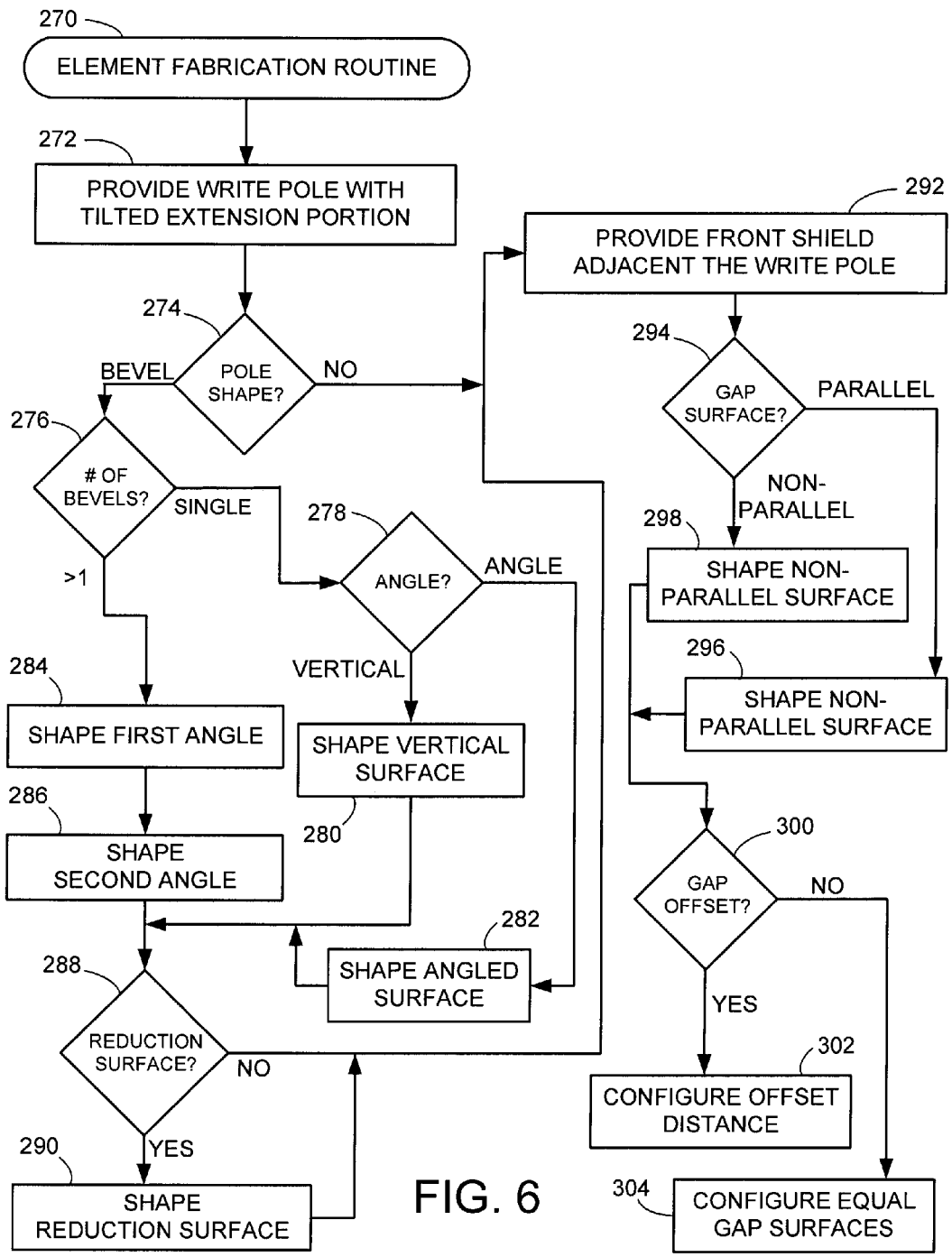
FIG. 6 provides a flowchart mapping a magnetic recording element fabrication routine conducted in accordance with various embodiments of the present invention.

FIG. 6 provides an embodiment of a magnetic recording element fabrication routine 270 conducted in accordance with various embodiments of the present invention. Initially, routine 270 provides a write pole in step 272 that is capable of programming magnetic bits on an adjacent storage media across an ABS and has a tilted extension portion that continuously extends from a write pole body. The shape of the write pole is determined in decision 274 with respect to whether or not beveled surfaces are to be included.

If beveled surfaces are chosen in decision 274, the routine 270 proceeds to decision 276 where the number of beveled surfaces is to be determined. The need for a single beveled surface advances the routine 270 to decision 278 where the angle of the single beveled surface is determined. From decision 278 a vertical (or orthogonal to the ABS) beveled surface can be configured in step 280 in a manner similar to the recording assembly 260 of FIG. 5D. If a non-vertical beveled surface is chosen, step 282 configures the extension portion of the write pole with a surface that has a predetermined angle with respect to the ABS and corresponding data media, such as the recording assembly 250 of FIG. 5C.

In the event of multiple beveled surfaces resulting from decision 276, the routine 270 progresses to steps 284 and 286 where first and second beveled surfaces with first and second angular orientations with respect to the ABS are respectfully configured, which can result in the recording assembly 240 of FIG. 5B. Regardless of the determinations in decisions 276 and 278, steps 280, 282, and 286 proceed to decision 288 where the need for a reduction surface is evaluated. Selection of a reduction surface then advances the routine 270 to step 290 where a reduction surface is shaped into the extension portion, as shown in FIGS. 5A and 5D, to reduce the thickness of the write pole and shorten the length of the write tip surface.

With the write pole constructed with various features to tune magnetic performance from decisions 274, 276, and 278, the extension portion of the write pole conforms to a predetermined configuration. Step 292 then follows step 290 to provide a front shield laterally adjacent to, but separated from, the shaped extension portion. Decision 294 then determines if the angular orientation of the gap surface of the front shield. A parallel configuration can result from decision 294 and advance the routine 270 to step 296 where the gap surface of the front shield is shaped to be parallel to the corresponding bevel or extension surface of the extension portion.

If a non-parallel gap surface on the front shield is chosen from decision 294, step 298 then configures the gap surface to a predetermined angular orientation with respect to the ABS. Following either steps 296 or 298, decision 300 determines the depth of the front shield and the corresponding offset distance between the front shield and the beveled extension portion surface. The determination of an offset proceeds to step 302 where the depth of the front shield, as measured normal to the ABS, is configured to be greater than the length of the beveled extension portion surface, as shown in FIGS. 5B-5D.

Alternatively in step 304, the depth of the front shield is shaped to be equal to or less than the bevel or extension surfaces of the extension portion, such as the recording assembly 210 of FIG. 5A. Through the routine 270, a recording assembly is constructed that can be used as a magnetic recording element. However, the routine is not required or limited as the various decisions and steps can be omitted, changed, and added. For example, the various steps and decisions associated with shaping the front shield can be done before, or simultaneously, with the shaping of the write pole.

It can be appreciated that the configuration and material characteristics of the recording assembly described in the present disclosure allows for enhanced magnetic programming through enhancement of write field angle and gradient. Magnetic saturation and write field performance can be tuned in a variety of manners through the construction of various features in the extension portion and front shield. Moreover, the tuning of magnetic flux delivery to a data medium allows for enhanced magnetic recording, especially in high linear bit density recordings.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
    a magnetic shield and gap separating a write pole from a return pole, the write pole having a body portion and an extension portion with parallel first and second sides that each tilt towards the magnetic shield at a predetermined angle proximal to an air bearing surface (ABS), the extension portion having at least one bevel surface facing a magnetic shield sidewall, the bevel surface extending a first distance from the ABS and the magnetic shield sidewall extending a second distance from the ABS, the first distance being less than the second distance.

2. The apparatus of claim 1, wherein the body portion has a body thickness and the extension portion laterally surpasses the extent of the body thickness.

3. The apparatus of claim 2, wherein the extension portion has an extension thickness that is less than the body thickness.

4. The apparatus of claim 3, wherein the extension portion tapers to the extension thickness with the at least one bevel surface having a greater angle than the predetermined angle.

5. The apparatus of claim 2, wherein the extension portion thickness is measured along a write tip surface on the ABS.

6. The apparatus of claim 1, wherein the magnetic shield is laterally adjacent the write pole on the ABS.

7. The apparatus of claim 1, wherein the body portion is defined by parallel body surfaces that extend orthogonal to the ABS and the extension portion is defined by parallel extension surfaces.

8. The apparatus of claim 7, wherein the magnetic shield is separated from the extension portion by a gap defined by parallel gap surfaces.

9. The apparatus of claim 1, wherein a first bevel surface is an extension surface of the extension portion and a second bevel surface is a sidewall of the magnetic shield.

10. The apparatus of claim 1, wherein a first bevel surface extends from an extension surface orthogonal to the ABS and a second bevel surface defines a sidewall of the magnetic shield.

11. The apparatus of claim 1, wherein a first bevel surface bevels an extension surface orthogonal to the ABS, a second bevel surface bevels the first bevel surface at a predetermined bevel angle.

12. The apparatus of claim 1, wherein a first bevel surface bevels an extension surface at a first predetermined bevel angle and the magnetic shield sidewall is beveled at a second predetermined bevel angle, different than the first predetermined bevel angle.

13. The apparatus of claim 1, wherein the magnetic shield sidewall is longer than a first bevel surface of the extension portion, the difference in length defining an offset distance.

14. An magnetic writing element comprising:
    a magnetic shield disposed between write and return poles, the magnetic shield laterally adjacent and separated from the write pole by a gap;
    a body portion of the write pole with a body thickness with first and second parallel sides; and
    an extension portion of the write pole continuously extending from the body portion with parallel third and fourth sides that each tilt towards the magnetic shield at a predetermined angle proximal to an air bearing surface (ABS), the extension portion having first and second bevel surfaces each facing a magnetic shield sidewall, the bevel surfaces extending a first distance from the ABS and the magnetic shield sidewall extending a second distance from the ABS, the first distance being less than the second distance.

15. The magnetic writing element of claim 14, wherein the first bevel surface is the third side and the magnetic shield sidewall is angled to provide a reduced first shield width at the ABS compared to an extended second shield width distal to the ABS.

16. The magnetic writing element of claim 14, wherein the first bevel surface extends from an extension surface orthogonal to the ABS.

17. The magnetic writing element of claim 14, wherein the first bevel surface bevels an extension surface orthogonal to the ABS, the second bevel surface bevels the first bevel surface at a predetermined bevel angle, and the magnetic shield sidewall is angled to provide an extended first shield width at the ABS and a reduced second shield width distal to the ABS.

18. The magnetic writing element of claim 14, wherein the first bevel surface bevels an extension surface at a predetermined bevel angle and the magnetic shield sidewall is angled to provide an extended first shield width at the ABS and a reduced second shield width distal to the ABS.

19. A method of providing a magnetic shield disposed between write and return poles and separated from the write pole by a gap and configuring the write pole with a body portion and an extension portion with parallel first and second sides that each tilt towards the magnetic shield at a predetermined angle proximal to an air bearing surface (ABS), the extension portion having at least one bevel surface facing a magnetic shield sidewall, the bevel surface extending a first distance from the ABS and the magnetic shield sidewall extending a second distance from the ABS, the first distance being less than the second distance.

20. The method of claim 19, wherein the extension portion has a reduction surface that tapers to a write pole tip surface on the ABS, the write pole tip surface having a length that is less than a body thickness of the pole body.

* * * * *